United States Patent [19]

Kwizda et al.

[11] 3,865,940
[45] Feb. 11, 1975

[54] PHARMACEUTICAL PREPARATION

[75] Inventors: Richard Kwizda; Johannes Kotlan, both of Wien, Austria

[73] Assignee: F. Joh. Kwizda, Vienna, Austria

[22] Filed: Aug. 10, 1972

[21] Appl. No.: 279,734

[30] Foreign Application Priority Data
Aug. 19, 1971 Austria .............................. 7265/71

[52] U.S. Cl................... 424/242, 424/273, 424/324
[51] Int. Cl............................................. A61k 27/00
[58] Field of Search............................ 424/273, 242

[56] References Cited
OTHER PUBLICATIONS
Chem. Abst. (1), 57–1489a, (1962).
Chem. Abst. (2), 74–57348b, (1971).

Merck Index, (1960), 7th Ed., pp. 330 & 608.

Primary Examiner—Stanley J. Friedman
Attorney, Agent, or Firm—Ernest G. Montague; Karl F. Ross; Herbert Dubno

[57] ABSTRACT

Disclosed are antirheumatic compositions containing therapeutically effective amounts of dimethyl aminophenazone and an alkali metal salt of 1-phenyl-4-n-butyl-3,5-dioxopyrazolidine in aqueous solution. The compositions can also contain effective amounts of Lidocaine and Dexamethasone.

The compositions described are prepared by bringing together under agitated flow conditions dimethyl aminophenazone with water which contains an alkali metal salt of 1-phenyl-4-n-butyl-3,5-dioxopyrazolidine as a solubilizer. The other active constituents can be added at the same time.

2 Claims, No Drawings

PHARMACEUTICAL PREPARATION

BACKGROUND OF THE INVENTION

The present invention relates to a pharmaceutical preparation in the form of aqueous, highly concentrated solution of dimethyl aminophenazone (also known as aminopyrine) and optionally other active principles.

In the treatment of certain diseases, for instance, in the treatment of rheumatic ailments, the parenteral administration of large quantities of medicaments has proven to be definitely advisable. The fact that such medicaments are frequently of very low water solubility, however, complicates this type of therapy. Ways have therefore been sought of preparing the high-concentration solutions required, so as to simplify administration of these medicaments.

This is effected first of all by conversion into salts which are readily soluble in water. This can be done, for example, in the case of the antirheumatic pharmaceutical dimethyl aminophenazone which in itself is of very poor solubility in water, namely 5.5% at room temperature, by the use of salicylic acid, benzoic acid and phthalic acid. Undesirably, however, solutions prepared in this manner are poorly tolerated since, due to the low basicity of the dimethyl aminophenazone, they have too acid a reaction. Salicylamide-O-acetic acid, p-acetaminophenyl ether glycolic acid and camphor sulfonic acid have also been used for the formation of salts.

The property of dimethyl aminophenazone to form readily soluble double compounds with alkali and alkali earth salts of organic acids forms the basis of various other methods. Thus, for example, there have been used for this purpose lithium, sodium and calcium salicylates, sodium and strontium sulfosalicylates, sodium salicylamide-O-acetate (see, for instance, German Pat. No. 903,624) and ethylene diamine phenylquinoline carboxylate.

Ethyl urethane is one of the first compounds to have been described as a pure solubilizer for dimethyl aminophenazone. However, dimethyl aminophenazone solutions of sufficient strength are only obtained if considerable quantities of urethane are used. Since the latter itself also exerts a pharmacological action which is not always desired, other substances have been sought as solubilizers for dimethyl aminophenazone. Mention may be made here of phenazone, 4-amino-phenazone, 4-methyl phenazone, isophenazone, 4-amino-isophenazone, 4-methyl isophenazone, 1,2-dimethyl-3-phenyl-4-dimethyl aminopyrazoline-(5), glycol monoethyl ether, glycol monoacetate, α-diethyl aminoacetyl-β-methyl-β-formyl hydrazine, α-diethyl aminoacetyl-β-methyl-β-acetyl hydrazine, as well as the sodium salts of benzyl butenolide, of 1,4-diphenyl-3,5-dioxopyrazolidine, of 1,4-diphenyl-3,5-dioxopyrazolidine-2-carboxylic acid dimethyl amide, and of 1,2-diphenyl-4-n-butyl-3,5-dioxopyrazolidine.

In particular the last-mentioned compound, namely diphenyl butazone, also known as phenyl butazone in accordance with WHO nomenclature, 1,2-diphenyl-4-n-butyl-3,5-dioxopyrazolidine, has found wide use as such as well as in combination with dimethyl aminophenazone in the treatment of rheumatic ailments. However, hand in hand with these recognized therapeutic effects occurs a relatively high percentage of side effects. Thus mention is made in the literature, inter alia, of the effects on the white corpuscles, thrombocytopenia, hemorrhage of internal organs, particularly gastric hemorrhages, as well as allergic reactions. Moreover, there is frequently obtained a retention of sodium chloride and consequently of water, which may at times be very considerable, so that manifest edemas occur. The time that the substance remains in the blood (using the so-called half-life as the yardstick) is relatively long.

It has also been proposed (cf. published German Patent Application No. 1,492,204) to use ethylene diamine, diethanolamine or diemethyl ethanolamine as solubilizers for monophenylbutazone, also known by the World Health Organization nomenclature of Mofebutazone (1-phenyl-4-n-butyl-3,5-dioxopyrazolidine), and/or dimethyl aminophenazone. In accordance with that disclosure, it is possible to prepare 5 or 10% solutions of monophenylbutazone which, in addition to 5% monophenylbutazone, can also contain a maximum of 6.25% dimethyl aminophenazone or a concentration which constitutes only an insignificant increase in the normal solubility of dimethyl aminophenazone (which is about 5.5%). Undesirably, these amine-containing solutions have the disadvantage of being subject to decomposing and of poor stability, as can be noted even from their strong yellow color.

In the search for a pharmaceutical preparation in the form of aqueous, highly concentrated solutions of dimethyl aminophenazone and optionally containing other active principles, it has now been found that the alkali salts of 1-phenyl-4-n-butyl-3,5-dioxopyrazolidine constitute excellent solubilizers when present in solubilizing amounts.

Accordingly, the pharmaceutical preparation of the invention comprises dimethyl aminophenazone, preferably in concentrations of about 10–20%, and optionally further active principles, for example Lidocaine (diethyl amino-2,6-dimethyl acetanilide) and Dexamethasone (9α-fluor-16α-methyl-prednisolone), and an alkali salt of 1-phenyl-4-n-butyl-3,5-dioxopyrazolidine in aqueous solution. The pharmaceutical compounds above indicated are known and can be prepared in known manner.

DESCRIPTION OF THE PREFERRED EMBODIMENTS

In accordance with a preferred embodiment of the invention, the sodium salt is used as alkali salt of 1-phenyl-4-n-butyl-3,5-dioxopyrazolidine. A preferred preparation in accordance with the present invention contains the alkali salt of 1-phenyl-4-n-butyl-3,5-dioxopyrazolidine and dimethyl aminophenazone in a ratio of about 4:1 to 4:3.

The method of the present invention is characterized by the fact that dimethyl aminophenazone, preferably in concentrations of 10–20%, and the other active principles if any, for instance Lidocaine (diethyl amino-2,6-dimethyl-acetanilide) and Dexamethasone (9α-fluor-16α-methyl-prednisolon) is or are introduced into water which contains an alkali salt of 1-phenyl-4-n-butyl-3,5-dioxopyrazolidine as solubilizer. In this connection the alkali salt, and particularly the sodium salt, of 1-phenyl-4-n-butyl-3,5-dioxopyrazolidine is prepared in situ simultaneously with the dissolving of the dimethyl aminophenazone and of the other active principles if any.

In accordance with one particularly suitable embodiment of the method of the present invention, 1-phenyl-4-n-butyl-3,5-dioxopyrazolidine in water is treated with an equivalent quantity of alkali, and particularly sodium hydroxide and the dimethyl aminophenazone is added to this solution, the ratio of alkali salt, and particularly sodium salt, of 1-phenyl-4-n-butyl-3,5-dioxopyrazolidine to dimethylaminophenazone being preferably between about 4:1 to 4:3.

Solutions containing 1-phenyl-4-n-butyl-3,5-dioxopyrazolidine sodium and dimethyl aminophenazone additionally have the ability of dissolving also other therapeutically valuable substances which are otherwise not soluble in water, such as, for instance, the aforementioned Lidocaine base (diethyl amino-2,6-dimethyl acetanilide) and Dexamethasone (9α-fluor-16α-methyl prednisolone).

The solutions of the present invention can be sterilized and thus used for injections. They represent a high-quality drug of reliable efficacy, even in the case of severe or very severe rheumatic ailments. Its therapeutic effect is therefore in no way inferior to the known combinations described above — particularly those having a base of diphenyl-butazone. Surprisingly, its known side effects, which are described in the literature (depending on the author) as being present in 20–40% of the cases treated, are practically entirely avoided by the administration of of the present solutions. Finally, its good tolerance is closely related to the fact that the half-life of monophenylbutazone in the blood (the simplest yardstick for the time that a drug remains in the organism) is only about half that of dimethylbutazone. In other words, while continued administration has a cumulative effect in connection with diphenylbutazone, as can be recognized from a broad spectrum of intolerance phenomena, it does not have such an effect in the case of the more rapidly degraded or eliminated monophenylbutazone.

It is furthermore known that diphenylbutazone has salt-retaining and water-retaining properties and in this way it also acts to increase the blood pressure. Exact comparative investigations under clinical conditions have shown that monophenylbutazone is free from these side effects.

It is noteworthy to remark that the preparation of the present invention does not appear to cause gastric ulcers. Extensive experiments on animals in comparison with a preparation of similar composition which, however, for the same content of Dexamethason contains diphenylbutazone sodium instead of monophenylbutazone sodium, has verified this experimentally. Similarly, it was possible to show that the last-mentioned combination has definite ulcerogenic properties.

Upon comparison of the acute toxicities, the preparation of the invention also comes out clearly superior. The $LD_{50}$ — namely that quantity of active principle at which 50% of a group of animals die — is 229 mg/kg upon intravenous administration, as compared with 130 mg/kg in the case of the comparison preparation containing diphenylbutazone. It is thus only approximately half as toxic as the latter.

The preparation of the solutions in accordance with the invention is extremely simple and is effected by merely bringing the substances together. It is furthermore an advantage that the alkali salts of 1-phenyl-4-n-butyl-3,5dioxopyrazolidine in the solution can be prepared directly by reacting equivalent quantities of 1-phenyl-4-n-butyl-3,5-dioxopyrazozlidine and alkali hydroxide.

The following examples illustrate the best mode of practising the invention.

EXAMPLE 1

157.4 g of sodium hydroxide, 913 g of 1-phenyl-4-n-butyl-3,5-dioxopyrazolidine and 750 g of dimethyl aminophenazone were dissolved in the sequence indicated, with agitation, in about 3 liters of water. Water was then added to a total volume of 5 liters.

EXAMPLE 2

157.4 g of sodium hydroxide, 913 g of 1-phenyl-4-n-butyl-3,5-dioxo-pyrazolidine, 500 g of dimethyl aminophenazone, 50 g of Lidocaine base (dimethyl amino-2,6-dimethyl acetanilide) and 5 g of Dexamethasone (9α-fluor-16α-methyl-prednisolone) were added in the sequence indicated to about 3 liters of water at room temperature, with stirring. Water was then added to make up the total volume of 5 liters.

When sodium hydroxide is replaced by other alkali hydroxides in the above procedure, substantially the same results are obtained.

While the present invention has been described herein mainly by reference to 1-phenyl-4-n-butyl-3,5-dioxopyrazolidine and dimethyl aminophenazone, it should be understood that the same includes also the combination of related equivalent compounds having various non-interfering substituents such as alkyl on their phenyl moieties. Similarly, xylidides other than Lidocaine and anti-inflammatories other than prednisolone can be incorporated in the preparation of the present invention.

We claim:

1. A pharmaceutical composition comprising an aqueous solution of dimethyl aminophenazone in a concentration between about 10 and 20%, and
    the sodium salt of 1-phenyl-4-n-butyl-3,5-dioxopyrazolidine present in a solubilizing amount, the ratio of said sodium salt to said dimethyl aminophenazone being from about 4:1 to 4:3.

2. The composition, as set forth in claim 1, containing therapeutically effective amounts of Lidocaine and Dexamethasone.

* * * * *